United States Patent
Matsen et al.

(10) Patent No.: US 11,758,622 B2
(45) Date of Patent: Sep. 12, 2023

(54) CHARGE HEATING METHOD AND SYSTEMS FOR INDUCTION MOLDING

(71) Applicant: The Boeing Company, Chicago, IL (US)

(72) Inventors: Marc R. Matsen, Seattle, WA (US); Tunde Olaniyan, Bothell, WA (US); Everette D. Gray, Seattle, WA (US); Landon K. Henson, Snoqualmie, WA (US); William C. Dykstra, Rockford, MI (US)

(73) Assignee: THE BOEING COMPANY, Arlington, VA (US)

( * ) Notice: Subject to any disclaimer, the term of this patent is extended or adjusted under 35 U.S.C. 154(b) by 743 days.

(21) Appl. No.: 16/459,306

(22) Filed: Jul. 1, 2019

(65) Prior Publication Data
US 2021/0007187 A1  Jan. 7, 2021

(51) Int. Cl.
*H05B 6/10* (2006.01)
*H05B 6/06* (2006.01)
(Continued)

(52) U.S. Cl.
CPC ............ *H05B 6/105* (2013.01); *B29C 35/02* (2013.01); *B29C 35/16* (2013.01); *B29C 43/52* (2013.01);
(Continued)

(58) Field of Classification Search
CPC . H05B 6/105; H05B 6/06; H05B 6/36; H05B 2206/023; H05B 6/062; H05B 1/02;
(Continued)

(56) References Cited

U.S. PATENT DOCUMENTS

| 4,351,629 A * | 9/1982 | Farrell ................. B29C 45/045 425/117 |
| 4,807,562 A * | 2/1989 | Sandys ............. C23C 16/45563 118/728 |

(Continued)

FOREIGN PATENT DOCUMENTS

| DE | 101 17 979 A1 | 8/2002 |
| EP | 2 806 711 A1 | 11/2014 |

(Continued)

OTHER PUBLICATIONS

Henson et al., "Thermal Stability of Geometrically Complex-Shaped Smart Susceptors," U.S. Appl. No. 15/884,976, filed Jan. 31, 2018.

(Continued)

*Primary Examiner* — Quang T Van
(74) *Attorney, Agent, or Firm* — MH2 Technology Law Group LLP

(57) ABSTRACT

A method and system for heating a material includes an induction coil, a susceptor providing a receptacle, where the receptacle is configured to receive the material, and at least one nozzle for ejecting a heated gas onto and/or into the material. During the method, the susceptor is heated by the induction coil, and thermal energy from the susceptor can be transferred to the material. In addition to being heated by heat from the susceptor, the material is also heated by the heated gas, thereby increasing a heating rate of the material to rapidly heat the material to a processing temperature. The system can include other components such as a gas source, at least one conduit that channels gas from the gas source to the at least one nozzle, and a heat source that heats the gas prior to ejecting the gas from the at least one nozzle.

20 Claims, 4 Drawing Sheets

(51) Int. Cl.
*B29C 35/02* (2006.01)
*B29C 35/16* (2006.01)
*B29C 43/52* (2006.01)
*H05B 6/36* (2006.01)
*B29C 35/08* (2006.01)

(52) U.S. Cl.
CPC ................ *H05B 6/06* (2013.01); *H05B 6/36* (2013.01); *B29C 2035/0811* (2013.01); *H05B 2206/023* (2013.01)

(58) Field of Classification Search
CPC .. H05B 3/0004; H05B 3/0014; H05B 3/0023; B29C 35/02; B29C 35/16; B29C 43/52; B29C 2035/0811; B29C 33/046; B29C 33/06; B29C 35/045; B29C 35/0805; B29C 39/38; B23K 9/1276; B23K 9/0956; B23K 9/28; B23K 9/32; B23K 26/1462; B23K 9/1272; B23K 9/173; G01S 15/06; G01N 29/04; A47J 31/20; A47J 31/0605
USPC ....... 219/634, 635, 730, 759, 647, 646, 633, 219/603, 600, 625, 630
See application file for complete search history.

(56) References Cited

U.S. PATENT DOCUMENTS

| | | | | |
|---|---|---|---|---|
| 4,943,405 | A | * | 7/1990 | Keller .................... B29C 43/42 425/398 |
| 5,728,309 | A | * | 3/1998 | Matsen ............... B29C 66/8322 72/70 |
| 8,017,059 | B2 | | 9/2011 | Matsen et al. |
| 2003/0024681 | A1 | * | 2/2003 | Soderstrom .............. B22C 1/02 164/122.2 |
| 2005/0035115 | A1 | | 2/2005 | Anderson et al. |
| 2015/0072100 | A1 | * | 3/2015 | Genba .................... C30B 25/12 117/88 |
| 2018/0319049 | A1 | | 11/2018 | Huang et al. |

FOREIGN PATENT DOCUMENTS

| | | | |
|---|---|---|---|
| EP | 3 487 262 A2 | 5/2019 | |
| EP | 3 487 262 A3 | 8/2019 | |

OTHER PUBLICATIONS

Extended European Search Report dated Sep. 30, 2020 in corresponding European Application No. 20168882.7, 9 pages.

* cited by examiner

CHARGE HEATING METHOD AND SYSTEMS FOR INDUCTION MOLDING

TECHNICAL FIELD

The present teachings relate to the field of thermal control of materials and, more particularly, to heating of materials using a smart susceptor.

BACKGROUND

A susceptor is a material that converts electromagnetic energy to thermal energy and may be used to heat various materials during, for example, a manufacturing process. A smart susceptor is a susceptor assembly that is self-regulating with regard to temperature. Typically, the smart susceptor is placed in an electromagnetic flux field that is generated by an inductor. Susceptor materials include various ferromagnetic materials, for example ferrous nickel-cobalt alloys such as Kovar®, as well as other alloys of iron, nickel, and cobalt.

At relatively low temperatures, the susceptor is highly permeable to the electromagnetic flux field and a cross sectional region through which electrons flow through the susceptor (i.e., the skin depth) is small. Thus, at these relatively low temperatures, an electrical resistance of the susceptor is high. When placed into the electromagnetic flux field generated, for example, by an induction coil that is part of the smart susceptor assembly, the susceptor begins to inductively heat due to the initially small skin depth and high magnetic permeability. As the susceptor heats, a thermal profile of the susceptor asymptotically approaches its leveling temperature. The leveling temperature is the temperature at which the susceptor maintains thermal equilibrium without a further increase in temperature even in the presence of the magnetic flux field, and depends at least in part on the ambient conditions surrounding the susceptor. The leveling temperature is typically a few degrees (e.g., within 2° F., or within 10° F., or within 50° F., or within 100° F.) below the smart susceptor's designed "Curie" temperature or "Tc", where the susceptor becomes nonmagnetic at the Curie temperature. As the susceptor approaches its leveling temperature, the magnetic permeability of the susceptor decreases, which increases the skin depth, thereby attenuating the electrical resistance of the susceptor and reducing the heating effect. The drop in magnetic permeability limits the generation of heat at those susceptor portions at or near the leveling temperature. The magnetic flux of the susceptor shifts to the lower temperature portions having a higher magnetic permeability, thereby causing those portions of the susceptor that are below the leveling temperature to heat more quickly toward the leveling temperature. The magnetic permeability at a given point in time can be different for different regions of the susceptor, depending on the localized temperature at localized regions. As each localized region of the susceptor approaches the leveling temperature, the localized region becomes increasingly nonmagnetic until steady state (i.e., thermal equilibrium) is reached and further heating of the susceptor at the localized region ceases. Regions of the susceptor that reach the Curie temperature become nonmagnetic at or above the Curie temperature. When the susceptor begins to cool, its magnetic permeability increases, the skin depth decreases, its electrical resistance increases, and the heating process begins again.

Because of its properties of temperature self-regulation, the smart susceptor is a valuable tool in manufacturing and other uses.

SUMMARY

The following presents a simplified summary in order to provide a basic understanding of some aspects of one or more implementations of the present teachings. This summary is not an extensive overview, nor is it intended to identify key or critical elements of the present teachings, nor to delineate the scope of the disclosure. Rather, its primary purpose is merely to present one or more concepts in simplified form as a prelude to the detailed description presented later.

In an implementation of the present teachings, a method for heating a material includes positioning the material within a receptacle of a susceptor assembly, heating a susceptor of the susceptor assembly with a magnetic flux field emitted by an induction coil, and heating the material within the receptacle with a heated gas directed to engage the material. The method can further include flowing a gas from a gas source into a conduit in fluid communication with the gas source, and heating the gas within the conduit to form the heated gas, wherein the heating the material further includes ejecting the heated gas from the conduit through a nozzle, to engage the material. The material can be a quantity of the material in a particulate form, and the heating of the material can further include placing the nozzle into the receptacle and into the quantity of the material prior to the heating of the material with the heated gas.

Optionally, the material can have a processing temperature and the method can further include discontinuing the heating of the material with the heated gas prior to the material reaching the processing temperature and further heating the material to the processing temperature using heat transferred from the susceptor to the material subsequent to the discontinuing of the heating of the material with the heated gas. The method can additionally include heating the material within the receptacle of the susceptor assembly with the susceptor of the susceptor assembly.

In an implementation, the susceptor can define at least a portion of a first die face and the method can further include heating a second die face using the magnetic flux field emitted by the induction coil, discontinuing the heating of the material with the heated gas prior to the material reaching a processing temperature of the material, heating the material to the processing temperature within the receptacle using heat transferred from the susceptor to the material subsequent to the discontinuing of the heating of the material with the heated gas, and engaging the material with the second die face. The susceptor can be heated to a Curie temperature at which the susceptor transitions from being magnetic to being non-magnetic.

In another implementation, a molding process includes positioning a molding material having a processing temperature within a receptacle defined by a susceptor assembly, wherein the susceptor assembly includes a susceptor, the susceptor defines a die face, and the die face is in thermal communication with the molding material. The method of this implementation further includes heating the molding material at a first heating rate with a heated gas directed to the molding material and heating the die face at a second heating rate by directing a magnetic flux field at the susceptor, wherein the first and second heating rates increase the temperature of the molding material and the die face to within 5° F. of the processing temperature within a period of 300 seconds of each other.

Optionally, the heating of the die face has a first temperature profile over a first duration of time, wherein the first duration of time begins when the magnetic flux field is first directed at the susceptor and ends when the molding material reaches the processing temperature, the heating of the molding material has a second temperature profile over a second duration of time, wherein the second duration of time begins when the heated gas is first directed to the molding material and ends when the molding material reaches the processing temperature, the first duration of time begins at the same time as the second duration of time, and the first temperature profile varies from the second temperature profile across the first and second durations of time by no more than 20° F. The first and second durations of time can be from 3.5 minutes to 7.0 minutes. Further, the molding process can include discontinuing the heating of the molding material with a heated gas upon reaching ±25° F. of the processing temperature The molding process can further include flowing a gas from a gas source into a conduit and heating the gas within the conduit to form the heated gas, wherein the heating of the material includes ejecting the heated gas through a nozzle, to engage the material. The molding material can be a quantity of the molding material in a particulate form and the heating of the material can include placing the nozzle into the receptacle and into the quantity of the molding material prior to the heating of the molding material with the heated gas. The first heating rate and the second heating rate can be from 100° F. per minute (° F./min) to 200° F./min.

In another implementation of the present teachings, a system for heating a molding material includes a susceptor assembly includes a susceptor, wherein the susceptor defines a receptacle configured to receive the molding material and the susceptor further defines a die face. The system further includes a gas injector configured to direct a heated gas toward molding material positioned within the receptacle. The gas injector can include a nozzle and a conduit in fluid communication with the nozzle, the nozzle can be configured to direct the heated gas from the conduit toward the molding material, and the system can further include a heat source configured to heat the gas within the conduit.

Optionally, the system further includes a plurality of gas injectors each having a nozzle and a conduit in fluid communication with the nozzle, wherein the nozzle of each of the plurality of gas injectors is configured to direct the heated gas toward the molding material. The system can further include an induction coil configured to emit a magnetic flux field toward the susceptor. In an implementation, the susceptor has a Curie temperature at which the susceptor transitions from being magnetic to being non-magnetic. Further, the gas injector can be non-magnetic.

BRIEF DESCRIPTION OF THE DRAWINGS

The accompanying drawings, which are incorporated in, and constitute a part of this specification, illustrate implementations of the present teachings and, together with the description, serve to explain the principles of the disclosure. In the figures.

Figure 1:
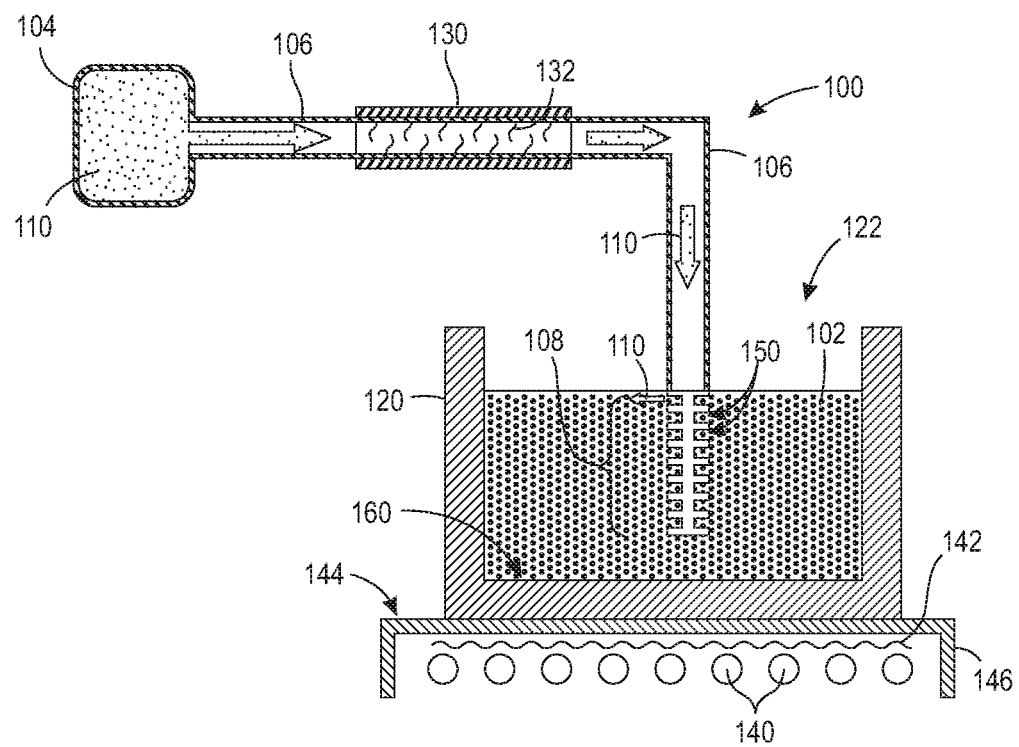
FIG. 1 is schematic cross section of a system for heating a material in accordance with an implementation of the present teachings.

It should be noted that some details of the figures have been simplified and are drawn to facilitate understanding of the present teachings rather than to maintain strict structural accuracy, detail, and scale.

DETAILED DESCRIPTION

Reference will now be made in detail to exemplary implementations of the present teachings, examples of which are illustrated in the accompanying drawings. Generally and/or where convenient, the same reference numbers will be used throughout the drawings to refer to the same or like parts.

As discussed above, smart susceptors are a useful tool in manufacturing and other uses due, in part, to their ability for thermal self-regulation. In flat (i.e., planar or blanket) configurations, the smart susceptor can maintain a generally uniform temperature across the entirety of the susceptor, for example, within 20° F., or within 10° F., of the leveling temperature for which it is designed. The smart susceptor can be designed to approach a predetermined leveling temperature by, for example, selecting the percentage of one or more component materials of the susceptor, such as the percentage of one or more metal or metal alloy components. The leveling temperature is also dependent to a lesser extent on magnetic field strength and other factors.

Smart susceptors can be employed in many different uses and configurations. In some uses, the susceptor can be formed to encase or sheathe a solid structure that is to be heated to a specific temperature, for example, during a drying or curing process. In other uses, the susceptor can be formed or contoured to provide a receptacle. The receptacle may be used, for example, to hold and heat a material such as a thermoset, thermoplastic, or mold material, or configured for other uses. For example, U.S. patent application Ser. No. 15/791,683 titled "Induction Molding for Parts Having Thermoplastic Portions," Filed Oct. 24, 2017, now U.S. Pat. No. 10,792,842, discusses a molding structure and process including a smart susceptor. As these materials are typically heated to a critical processing temperature or other target temperature for use, and overheating above the target temperature is avoided, a smart susceptor may lend itself particularly well to such processes as the smart susceptor is self-regulating with regard to temperature.

Heating a material within a receptacle of a contoured susceptor to a suitable temperature at which the material can be processed can have varying time requirements depending, for example, on the thermal characteristics of the material being heated, as well as the form of the material being heated. With some materials, the processing temperature is the melting point of the material, or the melting point of at least one component of the material. With some materials, the processing temperature is a temperature that is lower than the melting point of the material (or the melting point of at least one component of the material), but at which the material softens to the extent that it can be formed into a desired shape. In general, a material that has a high thermal conductivity has a better heating profile (that is, the material can be brought to the processing temperature in a shorter amount of time) than a material that is a poor thermal conductor. Further, a solid block of material will generally have a better heating profile than a highly porous material.

In one type of molding process to form a molded part, a raw material to be molded (i.e., the "charge") is placed into a receptacle, then heated to a suitable processing temperature (e.g., melted, made flowable, and so forth), in order to facilitate molding. The charge can be, for example, a composite material that includes carbon fiber pre-impregnated with a thermoplastic, commonly referred to as a prepreg. The prepreg can be prepared to have various forms, for example, the prepreg can have a chopped, granular, flaked, segmented, singularized, and/or another particulate form (referred to hereinafter, collectively, as "particulate"). The processing temperature of a prepreg is generally the softening or melting point of the thermoplastic component. In particular, a prepreg in this form has a low thermal conductivity and a high porosity. As such, the prepreg can be difficult to heat, for example, to a processing temperature, in terms of the time required to bring the prepreg to the processing temperature. This requirement can increase manufacturing expenses and device costs. An implementation in accordance with the present disclosure can provide a heating system and method that decreases the duration of time required to heat a charge within a receptacle, increases production throughput, and decreases manufacturing costs compared to some conventional heating systems and methods.

FIG. 1 is a schematic cross section of a system 100 for heating a material 102 in accordance with an implementation of the present teachings. The system 100 of FIG. 1 can be, for example, part of a molding system used during a molding process, or another type of system that is used to heat a material 102 such as the chopped prepreg described above, in which case material 102 represents a loose mass of discrete pieces of prepreg. FIG. 1 depicts a gas source 104 in fluid communication with at least one conduit 106, where the conduit 106 is or includes a gas injector 106 in fluid communication with at least one nozzle 108 and provides a pathway between the gas source 104 and the nozzle 108. The gas source 104 and a gas 110 within the gas source 104 are thereby in fluid communication with the nozzle 108 through the conduit 106. FIG. 1 further depicts a susceptor 120 that defines a receptacle 122. In an implementation, the susceptor 120 can be or include a smart susceptor having a Curie temperature, where heating of the smart susceptor is reduced or stopped once the smart susceptor reaches the Curie temperature, even in the presence of a continued magnetic flux field. In another implementation, the susceptor 120 can be or include a susceptor that does not have a Curie temperature but continues to heat in the presence of a continued magnetic flux field, where the temperature of the susceptor 120 can be controlled by cycling (i.e., powering on and off) the induction coil 140 (described below). The susceptor 120 is configured to receive the material 102 to be heated within the receptacle 122.

The gas 110 can be or include, for example, air or another gas or gases. In an implementation, the gas source 104 is a compressed gas cylinder that supplies the gas 110. In another implementation, the gas source 104 can be or include a blower including, for example, a fan or pump (not individually depicted for simplicity) that directs and/or supplies ambient air to the conduit 106. In another implementation, the gas source 104 can be a compressor.

FIG. 1 further depicts a heat source 130 that heats the gas 110 as it flows through the conduit 106 prior to exiting the nozzle 108. As depicted in FIG. 1, the heat source 130 can be or include a heating element, such as a resistance or inductive heating element, that envelops and/or encases the conduit 106. During use, the heat source 130 outputs a thermal energy 132 that heats the conduit 106 which, in turn, heats the gas 110 flowing therethrough.

The system 100 further includes an induction coil 140 configured to generate a magnetic flux field 142 and to emit the magnetic flux field 142 onto the susceptor 120. The induction coil 140 can be positioned below a surface 144 of a support structure 146 wherein, during use, the susceptor 120 rests on the surface 144. The conduit 106 and the nozzle 108 are manufactured from a non-magnetic material such as copper or a heat-resistant synthetic material to prevent the heating thereof by the induction coil 140.

In an exemplary method or process using the system 100, the material 102 is placed into the receptacle 122 and the nozzle 108 is positioned relative to the material 102 so as to direct a heated gas onto the material 102 within the receptacle 122. While FIG. 1 depicts the nozzle 108 placed into the mass of material 102 (e.g., placed such that at least a portion of the nozzle 108 is positioned below an upper surface of the mass of material 102 within the receptacle 122), it will be appreciated that the nozzle 108 can be placed in another position that directs the heated gas 110 onto the material 102. For example, the nozzle 108 can be placed above the material 102 such that the nozzle 108 directs heated gas 110 downward onto and into the material 102. The position of the nozzle 108 may depend, at least in part, on the form of the material 102.

After positioning the nozzle 108, the gas 110 is released from the gas source 104 into the conduit 106 at a desired gas flow rate. For example, the gas 110 can be released into the conduit 106 at a flow rate of from about 0.01 cubic feet per minute ($ft^3$/min) to about 10 $ft^3$/min, or from about 0.10 $ft^3$/min to about 1.0 $ft^3$/min. The gas flow rate may depend, at least in part, on various aspects of the design of the system 100, for example, on the size and configuration of the conduit(s) 106 and the configuration and number of nozzle(s) 108. The gas 110 is heated as it passes through the portion of the conduit 106 that is heated by the heat source 130. In an implementation, the gas 110 can be heated to a temperature of from about 300° F. to about 900° F., or from about 500° F. to about 700° F. The temperature to which the gas 110 is heated may depend, for example, on the material 102 to be heated. After the gas 110 is heated, it continues through the conduit 106 to the nozzle 108. The gas 110 is directed by the nozzle 108 onto and/or into (or otherwise to engage) the material 102 as depicted. In FIG. 1, the nozzle 108 includes a plurality of ports 150 from which the heated gas 110 is ejected from the nozzle 108 onto the material 102. The heated gas 110 ejected from the nozzle 108 onto the material 102 thereby heats the material 102.

During the heating of the material 102 by the heated gas 110 ejected from the nozzle 108, the induction coil 140 is activated (i.e., powered) to generate and emit a magnetic flux field 142 to engage the susceptor 120. As such, the material 102 is heated by two sources, the susceptor 120 and the heated gas 110 ejected from the nozzle 108. Further, the heating occurs from at least two opposite directions (e.g., from the direction of the vertical sides of the susceptor 120 and the opposite direction from the horizontal ejection of heated gas 110 from the ports 150 of the nozzle 108 as depicted in FIG. 1). However, owing to high void volume and low thermal conductivity of some materials, such as chopped prepreg, the heat provided to the material 102 via the heated gas 110 may be more effective at quickly bringing the material 102 to the processing temperature as compared to the heat provided by the susceptor 120.

In some implementations, the heating of the susceptor 120 can begin by powering the induction coil 140 at the about the same time (e.g., simultaneously, within ±5 seconds, within ±10 seconds, etc.) as an initiation of the ejection of the heated gas 110 from the nozzle 108. In an alternative, either of the heating by the susceptor 120 and the heating by the heated gas 110 can occur before the other (e.g., more than 10 seconds before the other), depending on the individual process requirements.

In some processes, the heat from both sources (i.e., heat provided by the susceptor 120 and heat provided by the heated gas 110) can be removed from the material 102 at about the same time upon the material 102 reaching a processing temperature. In other processes, the heat provided by one of the sources can be removed prior to removal of the other source. For example, heat can be applied to the material 102 from both the susceptor 120 and the nozzle 108 until the material 102 reaches a target temperature, such as a temperature lower than a processing temperature, at which point heat from one of the sources (e.g., heat from either the susceptor 120 or the nozzle 108) can be removed while heat from the other source continues, to bring the material 102 to the processing temperature. For example, in applications in which the processing temperature is a melting temperature for the material 102 (or a component thereof), it may be desired to remove the nozzle 108 from the material 102 prior to reaching the melting temperature, such as to prevent the molten material from contaminating or adhering to the nozzle 108. Accordingly, in some processes, nozzle 108 may be removed from the material 102 once the material 102 reaches a target temperature, which may be below a melting temperature of the material 102 or a component of the material 102. In such processes, the susceptor 120 may provide the additional heating necessary to bring the material 102 to the processing temperature without further heating the material 102 using the heated gas 110.

Figure 2:
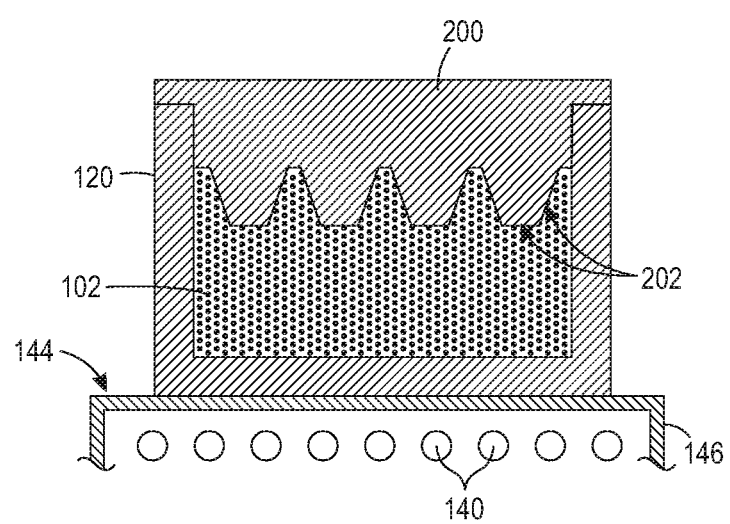
FIG. 2 is a cross section of the FIG. 1 structure during a molding process.

In an example implementation, the susceptor 120 is a first susceptor 120 that provides a first mold section that defines a first die face 160. In such an implementation, the system 100 further includes a second susceptor 200 that provides a second mold section that defines a second die face 202, as depicted in FIG. 2. If the configuration shown in FIG. 1 is thought of as depicting a material heating stage of a process, such as a molding process, then FIG. 2 may be thought of as depicting a forming stage, in which the second mold section is moved into place or position to form a part, structure, or component from the heated material. During the heating of the first susceptor 120 in the material heating stage of FIG. 1, the second susceptor 200 can also be heated by the induction coil 140, or a separate induction coil (not individually depicted for simplicity). The second susceptor 200 may then be moved into the position shown in FIG. 2.

Figure 3:
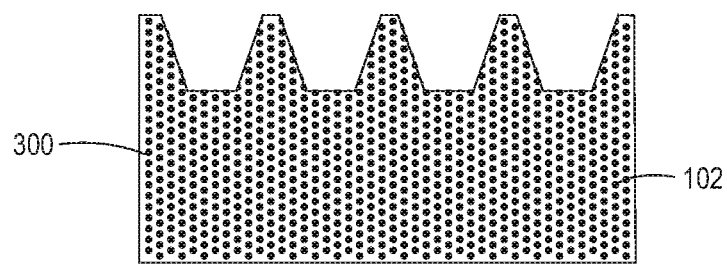
FIG. 3 is a cross section of the material after a molding process and after removing the material from the system.

As depicted in FIG. 2, the nozzle 108 has been repositioned away from (e.g., removed from) the receptacle 122, and the second mold section 200 has been placed to engage the material 102 such that the second die face 202 physically contacts the material 102 so that the die faces 160, 202 form a molded component from the material 102. Subsequently, the material 102 may be cooled, the second susceptor 200 may be removed from the material 102, and the material 102 is removed from the first susceptor 120 to result in the molded component 300 of FIG. 3 formed from the material 102. It will be appreciated that the form of molded component 300 is an example, and other forms of the molded component 300 are contemplated.

Figure 4:
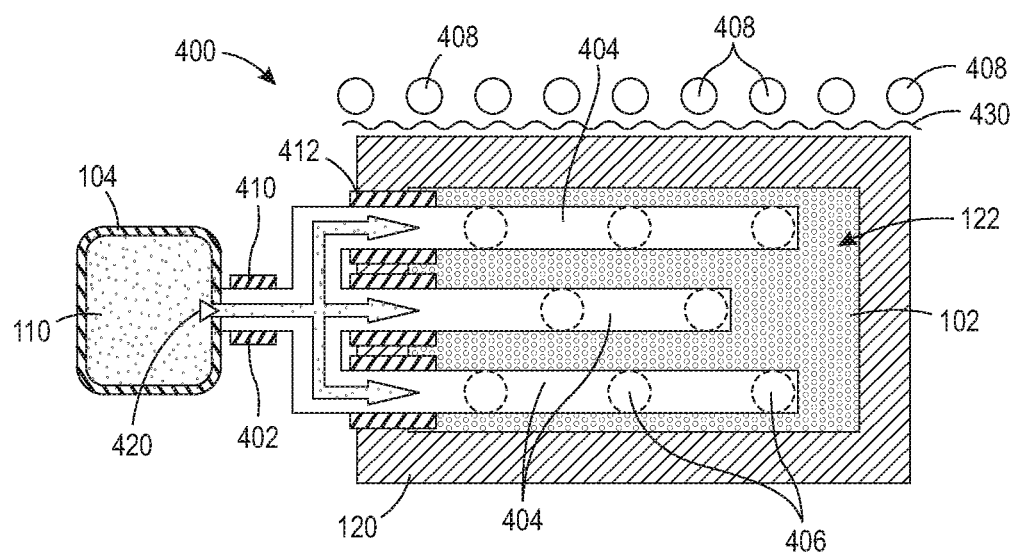
FIG. 4 is a schematic plan view of another implementation of a system for heating a material in accordance with the present teachings.

FIG. 4 is a top view depicting another implementation of a system 400 for heating a material 102 within a susceptor 120 that defines a receptacle 122. The system 400 includes a gas 110 within a gas source 104, where the gas 110 and the gas source 104 are in fluid communication with a primary conduit 402. The primary conduit 402 is in fluid communication with a plurality of secondary conduits 404 which are or provide a plurality of gas injectors 404 which, in turn are in fluid communication with a plurality of nozzles 406. The system 400 further includes an induction coil 408 configured to heat the susceptor 120, and at least one heat source configured to heat the gas 110 prior to the gas 110 exiting the plurality of nozzles 406. The heat source can include either a first heat source 410 that heats the primary conduit 402 and the gas 110 as it passes through the primary conduit 402, a second heat source 412 that heats the plurality of secondary conduits 404 and the gas 110 as it passes through the plurality of secondary conduits 404, or both the first heat source 410 and the second heat source 412.

The system 400 of FIG. 4 including a plurality of nozzles 406 may provide more even heating of a material 102 over a larger area compared to, for example, a system including only a single nozzle. While FIG. 4 depicts the system 400 including one primary conduit 402, three secondary conduits 404, and eight nozzles 406, other configurations are contemplated.

During use of the system 400 of FIG. 4, the gas 110 may be released from the gas source 104 into the primary conduit 402 using, for example, a valve 420. The gas passes from the gas source 104 into the primary conduit 402, then into the plurality of secondary conduits 404. The gas 110 may be heated within the primary conduit 402 by the first heat source 410, within the plurality of secondary conduits 404 by the second heat source 412, or by both the first heat source 410 and the second heat source 412. The heated gas 110 then travels through the plurality of secondary conduits 404 and into the plurality of nozzles 406, then is directed onto and/or into the material 102 by the plurality of nozzles 406.

During the heating of the material 102 using the heated gas 110 ejected from the plurality of nozzles 406, the induction coil 408 is powered to emit a magnetic flux field 430 onto the susceptor 120. The magnetic flux field 430 causes the susceptor 120 to heat, which thereby heats the material 102 in conjunction with the heated gas 110. In an example process, once the material 102 reaches a first processing temperature, the flow of gas 110 from the gas source 110 can be stopped, the heating of the conduits 402, 404 using the first and/or second heat sources 410, 412 can be stopped, and the plurality of nozzles 406 can be removed from the receptacle 122. Additional heating of the material 102 can continue solely through the heating provided by the susceptor 120. In another example process, heating by the heated gas 110 and the susceptor 120 can be stopped at the same time. In yet another example process, heating of the material 102 using the susceptor 120 can be stopped while heating of the material 102 using the heated gas 110 continues.

Generally speaking, in an application in which a charge material such as a mass of chopped prepreg material is placed on an inductively heated susceptor and heated solely by the susceptor, the susceptor reaches the processing temperature much more rapidly than the charge material owing, at least in part, to the low thermal conductivity of the material. This can result in processing delays because of the additional time required to bring the material to the processing temperature. An implementation in accordance with the present disclosure can increase the heating rate of a material such as a segmented or chopped prepreg to more closely match the heating rate of the susceptor, so that the material is brought to the processing temperature in a shorter amount or duration of time, for example at a heating rate that more closely matches a heating rate of the susceptor. The target temperature can be a processing temperature that varies depending on the material and the process. For example, the processing temperature may be below, at, or above a melting temperature of the material or a component of the material.

Further, with prior systems, a temperature of the material being heated lags a temperature of the susceptor. In contrast, using a system in accordance with the present teachings, a temperature of the material being heated can match (or more closely match) a temperature of the susceptor for any point in time during the heating. For example, during heating, a mean temperature of the material within a receptacle provided by a susceptor can be within ±90%, or within ±20%, of a temperature of the susceptor or a die face defined by the susceptor. The percentage may be determined for any point in time with the formula $(T_1-T_2)/T_1$, where $T_1$ is the temperature of the die face defined by the susceptor and $T_2$ is the temperature of the material being heated.

Figure 5:
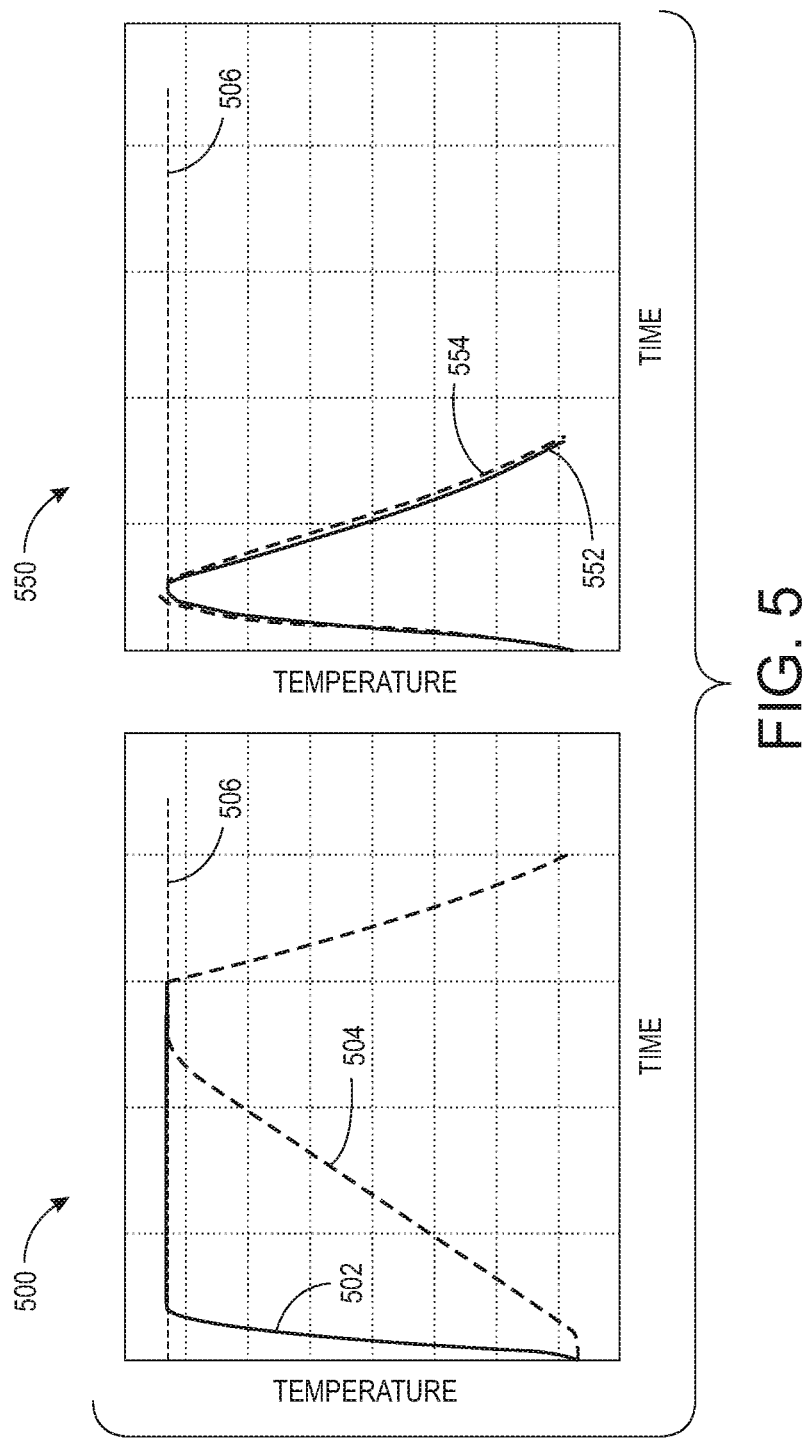
FIG. 5 depicts a first graph of heating profiles of a conventional system and a second graph of heating profiles of a system according to the present teachings.

For example, FIG. 5 includes a first graph 500 of a heating profile that may be representative of a system in which a material is heated only by a susceptor, and a second graph 550 of a heating profile of a system according to an implementation of the present disclosure (that is, a system in which the material is at least partially heated using a heated gas, such as the system depicted in FIG. 1). The time and temperature scales of the graphs 500, 550 have been normalized relative to each other.

The first graph 500 includes a first heating profile (i.e., a first heating rate) 502 of a susceptor (e.g., susceptor 120) and a second heating profile (i.e., a second heating rate) 504 of a material (e.g., material 102, such as a chopped or segmented prepreg) during heating of the susceptor. As noted above, in the first graph 500, the material is heated solely by the susceptor, where the susceptor is heated using a magnetic flux field generated by an induction coil as described above. During heating, the heating profile 502 of the susceptor results in the susceptor reaching a target temperature 506 in much less time than is demonstrated by the heating profile 504 of the material being heated by the susceptor. As depicted in the first graph 500, the temperature of the material being heated significantly lags the temperature of the susceptor until the material reaches the target temperature 506.

Described another way, in the first graph 500, the first temperature profile 502 has a first duration of time, wherein the first duration of time begins when the induction coil is powered at time=0 and ends when the susceptor reaches the target temperature 506. The second temperature profile 504 has a second duration of time, wherein the second duration of time begins when the induction coil 140 is powered at time=0 and ends when the material 102 reaches the target temperature 506. Thus the second duration of time is significantly longer than the first duration of time.

In contrast, the second graph 550 includes a third heating profile (i.e., a third heating rate) 552 of a susceptor (e.g., susceptor 120) and a fourth heating profile (i.e., a fourth heating rate) 554 of a material (e.g., material 102, such as a chopped or segmented prepreg) during heating of the susceptor. In the second graph 550, the material is heated by both the susceptor and a heated gas delivered onto and/or into the material using an implementation of the present teachings as described above, such as system 100, 400. During heating of the material by both the susceptor and the heated gas, the susceptor and the material both first reach the target temperature 506 a much shorter duration than is depicted in the first graph 500. For example, the third heating rate 552 and the fourth heating rate 554 can increase the temperature of the material 102 (for example, a molding material) and the susceptor (for example, a first die face defined by the susceptor) to within 50° F. of a processing temperature within a period of 300 seconds of each other. As depicted in second graph 550, the temperature of the material shown in the fourth profile 554 closely matches the temperature of the susceptor shown in the third profile 552, varying by no more than ±25%, or by no more than ±10%, throughout the heating of the material at any point in time up to the target temperature 506. In the second graph 550, the heating of the susceptor and the ejection of the heated gas onto the material begin generally at the same time (i.e., within 5 seconds of each other). The structure and performance characteristics of the heating system can be adjusted as described below so that the heating rate and heating profile of the susceptor (e.g., the mold section and/or die face defined by the mold section) match the heating rate and heating profile of the material (e.g., the charge).

Described another way, in the second graph 550, the third temperature profile 552 has a third duration of time, wherein the third duration of time begins when the induction coil is powered (as depicted in the second graph 550, at time=0) and ends when the susceptor reaches the target temperature 506. The fourth temperature profile 554 has a fourth duration of time, wherein the fourth duration of time begins when the heated gas is first directed to the material (as depicted in the second graph 550, at time=0) and ends when the material 102 reaches the target temperature 506. Thus the third and fourth durations are about equal and may vary, for example, by less than 5 minutes, or by less than one minute. In an implementation, the third and fourth durations of time can be, for example, from about 3.5 minutes to about 7.0 minutes. Further, during the third and fourth durations of time, the temperature of the susceptor varies from the temperature of the material by no more than ±5%, or by no more than ±0.5% throughout the entire third and fourth durations of time. It will be appreciated that, while in the second graph 550 the coil is powered at the same time that the heated gas is ejected from the nozzle at t=0, in other processes the induction coil may be powered before the heated gas is ejected from the nozzle, or the heated gas may be ejected from the nozzle before the induction coil is powered.

The first graph 500 demonstrates that an extended period of time is required to heat the material to the target temperature 506 when the material is heated by the susceptor alone. The second graph 550 demonstrates that a much shorter time is required to heat the material to the target temperature 506 when the material is heated by both the susceptor and the heated gas compared to the first graph. Generally, analyzing data derived from experimentation, it has been found that heating the material with both the susceptor and the heated gas can be performed in half the time, or less than half the time, required by heating the material with the susceptor alone. The rate of charge heating can be from about 5° F. per minute (° F./min) to about 500° F./min, or from about 100° F./min to about 200° F./min when heated gas is introduced onto the charge. In the second graph 550, the heating rate 554 of the charge from time=0 until the charge temperature reaches the target temperature 506 is about 77° F./min, which results in the charge reaching a target temperature of 750° F. in less than 10 minutes. During a mold process, the time required for the susceptor (e.g., the first mold section) to reach the target temperature may be longer or shorter than the time required for the charge to reach the target temperature, depending on the system design. In some processes, it may be desirable to adjust a heating rate and a heating profile of the charge so that the charge and the susceptor (e.g., the first mold section) reach the target temperature simultaneously or approximately simultaneously (e.g., within one minute of each other, or with five minutes of each other) as shown in the second graph 550. Matching the heating profile (heating rate) of the charge with the heating profile (heating rate) of the susceptor ensures, for example, that the die face defined by the susceptor reaches the target temperature at the same time or about the same time as the charge, and does so with the same heating profile or about the same heating profile. This can be accomplished, for example, by adjusting (i.e., increasing or decreasing) a maximum temperature of the heated gas that flows through the nozzles, changing (i.e., increasing or decreasing) the number of nozzles within the system, changing the size and/or number of slots within the nozzles, changing the pressure or flow of the gas within the conduits, adjusting the power applied to the induction coil, a combination of these factors, or by changing or adjusting another relevant factor(s) that will become apparent to those of ordinary skill in the art. In some implementations, the heating rates and profiles of the susceptor (i.e., mold section and/or die face defined by the susceptor) and the charge can be monitored during the heating. Various system parameters (e.g., temperature and flow rate of the heated gas) can be adjusted in situ to adjust the heating rate and profile of the charge so that they match the heating rate and profile of the susceptor.

Figure 6:
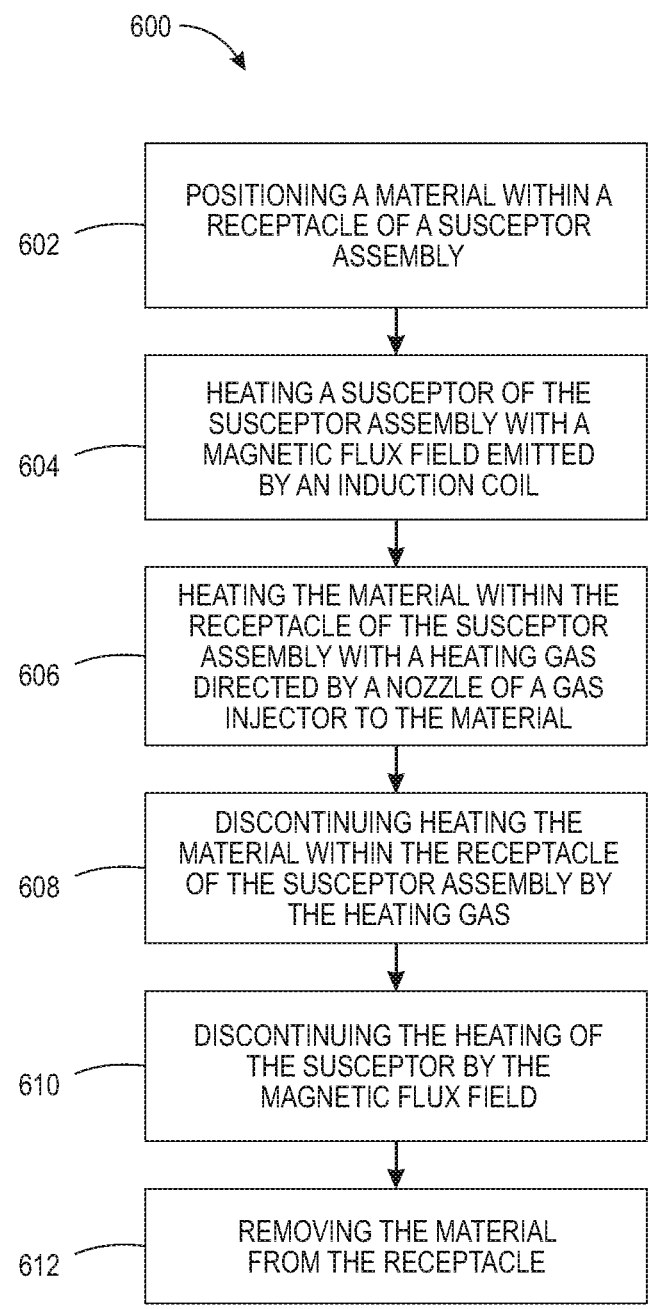
FIG. 6 is a flow chart or flow diagram of a method in accordance with an implementation of the present teachings.

FIG. 6 depicts a method 600 for heating a material. The method 600 may proceed by operation or use of one or more of the structures depicted in FIGS. 1-4 described above, and thus is described with reference to these figures; however, it will be appreciated that the method 600 is not limited to any particular structure or use unless expressly stated herein. The method 600 may be performed before, during, or after other processes, for example, as an assembly sub-process. It will be appreciated that while the process is described as a series of acts or events, the present teachings are not limited by the ordering of such acts or events. Some acts may occur in different orders and/or concurrently with other acts or events apart from those described herein. Further, a method in accordance with the present teachings may include other acts or events that have not been depicted for simplicity, while one or more depicted acts or events may be removed or modified.

At 602, a material 102 such as prepreg is positioned within a receptacle 122 of a susceptor assembly 100, 400, where the receptacle 122 may be provided, for example, by a susceptor 120. The method 600 further incudes heating of the susceptor 120 of the susceptor assembly 100, 400 with a magnetic flux field 142, 430 emitted by an induction coil 140 as at 604. Thermal energy from the susceptor 120 may be transferred to the material 102 within the receptacle 122 during and/or after the heating of the susceptor 120. At 606, the material 102 within the receptacle 122 is heated with a heated gas 110 directed by a nozzle 108, 406 of a gas injector 106, 404 to the material 102. Subsequently, heating of the material 102 within the receptacle 122 by the heated gas 110 is discontinued as at 608. The method 600 further includes discontinuing the heating of the susceptor 120 by the magnetic flux field 142, 430 as at 610. The discontinuing of the heating of the susceptor 120 at 610 can be performed before, after, or at the same time as the discontinuing of the heating of the material 102 at 608. At 612, the method 600 further includes removing the material 102 from the receptacle 122 provided by the susceptor 120. The removing at 612 can be performed, for example, before or after cooling the material 102 within the receptacle 122.

All ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

While the present teachings have been illustrated with respect to one or more implementations, alterations and/or modifications can be made to the illustrated examples without departing from the spirit and scope of the appended claims. For example, it will be appreciated that while the process is described as a series of acts or events, the present teachings are not limited by the ordering of such acts or events. Some acts may occur in different orders and/or concurrently with other acts or events apart from those described herein. Also, not all process stages may be required to implement a methodology in accordance with one or more aspects or implementations of the present teachings. It will be appreciated that structural components and/or processing stages can be added or existing structural components and/or processing stages can be removed or modified. Further, one or more of the acts depicted herein may be carried out in one or more separate acts and/or phases. Furthermore, to the extent that the terms "including," "includes," "having," "has," "with," or variants thereof are used in either the detailed description and the claims, such terms are intended to be inclusive in a manner similar to the term "comprising." The term "at least one of" is used to mean one or more of the listed items can be selected. As used herein, the term "one or more of" with respect to a listing of items such as, for example, A and B, means A alone, B alone, or A and B. Further, in the discussion and claims herein, the term "on" used with respect to two materials, one "on" the other, means at least some contact between the materials, while "over" means the materials are in proximity, but possibly with one or more additional intervening materials such that contact is possible but not required. Neither "on" nor "over" implies any directionality as used herein. The term "conformal" describes a coating material in which angles of the underlying material are preserved by the conformal material. The term "about" indicates that the value listed may be somewhat altered, as long as the alteration does not result in nonconformance of the process or structure to the illustrated implementation. Finally, "exemplary" indicates the description is used as an example, rather than implying that it is an ideal. Other implementations of the present teachings will be apparent to those skilled in the art from consideration of the specification and practice of the disclosure herein. It is intended that the specification and examples be considered as exemplary only, with a true scope and spirit of the present teachings being indicated by the following claims.

Terms of relative position as used in this application are defined based on a plane parallel to the conventional plane or working surface of a workpiece, regardless of the orientation of the workpiece. The term "horizontal" or "lateral" as used in this application is defined as a plane parallel to the conventional plane or working surface of a workpiece, regardless of the orientation of the workpiece. The term "vertical" refers to a direction perpendicular to the horizontal. Terms such as "on," "side", "higher," "lower," "over," "top," and "under" are defined with respect to the conventional plane or working surface being on the top surface of the workpiece, regardless of the orientation of the workpiece.

The invention claimed is:

1. A method for heating a material, comprising:
    positioning a molding material within a receptacle of a susceptor assembly;
    heating a susceptor of the susceptor assembly with a magnetic flux field emitted by an induction coil; and
    placing a gas injector comprising a nozzle into the receptacle to direct a heated gas into the molding material positioned within the receptacle; and
    heating the material within the receptacle with a heated gas directed into the molding material; and
    wherein the susceptor further defines a die face.

2. The method of claim 1, further comprising:
    flowing a gas from a gas source into a conduit in fluid communication with the gas source; and
    heating the gas within the conduit to form the heated gas,
    wherein the heating the material further includes ejecting the heated gas from the conduit through the nozzle, to engage the material.

3. The method of claim 2, wherein:
    the material is a quantity of the material in a particulate form; and
    the heating of the material further includes placing the nozzle into the receptacle and into the quantity of the material prior to the heating of the material with the heated gas.

4. The method of claim 1, wherein the material has a processing temperature and the method further comprises:
    discontinuing the heating of the material with the heated gas prior to the material reaching the processing temperature; and
    further heating the material to the processing temperature using heat transferred from the susceptor to the material subsequent to the discontinuing of the heating of the material with the heated gas.

5. The method of claim 1, further comprising heating the material within the receptacle of the susceptor assembly with the susceptor of the susceptor assembly.

6. The method of claim 1, wherein the susceptor defines at least a portion of a first die face and the method further comprises:
    heating a second die face using the magnetic flux field emitted by the induction coil;
    discontinuing the heating of the material with the heated gas prior to the material reaching a processing temperature of the material;
    heating the material to the processing temperature within the receptacle using heat transferred from the susceptor to the material subsequent to the discontinuing of the heating of the material with the heated gas; and
    engaging the material with the second die face.

7. The method of claim 1, further comprising heating the susceptor to a Curie temperature at which the susceptor transitions from being magnetic to being non-magnetic.

8. A molding process, comprising:
    positioning a molding material having a processing temperature within a receptacle defined by a susceptor assembly, wherein:
        the susceptor assembly comprises a susceptor;
        the susceptor defines a die face; and
        the die face is in thermal communication with the molding material;
    placing a nozzle into the receptacle and into a quantity of the molding material;
    heating the molding material at a first heating rate with a heated gas directed into the molding material; and
    heating the die face at a second heating rate by directing a magnetic flux field at the susceptor,
    wherein the first and second heating rates increase the temperature of the molding material and the die face to within 5° F. of the processing temperature within a period of 300 seconds of each other.

9. The molding process of claim 8, wherein:
    the heating of the die face has a first temperature profile over a first duration of time, wherein the first duration of time begins when the magnetic flux field is first directed at the susceptor and ends when the molding material reaches the processing temperature;
    the heating of the molding material has a second temperature profile over a second duration of time, wherein the second duration of time begins when the heated gas is first directed to the molding material and ends when the molding material reaches the processing temperature;
    the first duration of time begins at the same time as the second duration of time; and
    the first temperature profile varies from the second temperature profile across the first and second durations of time by no more than 20° F.

10. The molding process of claim 9, wherein the first and second durations of time are from 3.5 minutes to 7.0 minutes.

11. The molding process of claim 8, further comprising:
    flowing a gas from a gas source into a conduit; and
    heating the gas within the conduit to form the heated gas,
    wherein the heating of the material includes ejecting the heated gas through the nozzle, to engage the material.

12. The molding process of claim 11, wherein:
    the molding material is a quantity of the molding material in a particulate form; and
    the heating of the material includes placing the nozzle into the receptacle and into the quantity of the molding material prior to the heating of the molding material with the heated gas.

13. The molding process of claim 8, wherein the first heating rate and the second heating rate are from 100° F. per minute (° F./min) to 200° F./min.

14. The molding process of claim 8, further comprising discontinuing the heating of the molding material with a heated gas upon reaching ±25° F. of the processing temperature.

15. A system for heating a molding material, comprising:
    a susceptor assembly comprising a susceptor, wherein:
        the susceptor defines a receptacle configured to receive the molding material; and
        the susceptor further defines a die face; and
    a gas injector comprising a nozzle configured to be positioned within the receptacle and configured to direct a heated gas into the molding material positioned within the receptacle.

16. The system of claim 15, wherein:
the gas injector further comprises a conduit in fluid communication with the nozzle;
and the system further comprises a heat source configured to heat the gas within the conduit.

17. The system of claim 16, further comprising a plurality of gas injectors each comprising a nozzle and a conduit in fluid communication with the nozzle, wherein the nozzle of each of the plurality of gas injectors is configured to direct the heated gas toward the molding material.

18. The system of claim 15, further comprising an induction coil configured to emit a magnetic flux field toward the susceptor.

19. The system of claim 15, wherein the susceptor comprises a Curie temperature at which the susceptor transitions from being magnetic to being non-magnetic.

20. The system of claim 19, wherein the gas injector is non-magnetic.

\* \* \* \* \*